(12) United States Patent
He et al.

(10) Patent No.: US 11,864,552 B2
(45) Date of Patent: Jan. 9, 2024

(54) DIGITAL DETECTION METHOD AND SYSTEM FOR PREDICTING DRUG RESISTANCE OF TRANSGENIC MAIZE

(71) Applicant: Zhejiang University, Hangzhou (CN)

(72) Inventors: Yong He, Hangzhou (CN); Xuping Feng, Hangzhou (CN); Mingzhu Tao, Hangzhou (CN); Rui Yang, Hangzhou (CN); Jinnuo Zhang, Hangzhou (CN); Yongqiang Shi, Hangzhou (CN)

(73) Assignee: Zhejiang University, Hangzhou (CN)

( * ) Notice: Subject to any disclaimer, the term of this patent is extended or adjusted under 35 U.S.C. 154(b) by 379 days.

(21) Appl. No.: 17/399,826

(22) Filed: Aug. 11, 2021

(65) Prior Publication Data

US 2022/0217966 A1    Jul. 14, 2022

(30) Foreign Application Priority Data

Jan. 11, 2021   (CN) .......................... 202110029557.8

(51) Int. Cl.
*A01M 7/00*       (2006.01)
*G06T 7/136*      (2017.01)
(Continued)

(52) U.S. Cl.
CPC ........... *A01M 7/0089* (2013.01); *A01G 22/20* (2018.02); *G01S 17/894* (2020.01); *G06N 3/044* (2023.01);
(Continued)

(58) Field of Classification Search
CPC ........ A01N 63/00; A01P 7/04; A01M 7/0089; G06T 7/136; G06T 7/62; G06T 7/11; G06T 7/90; G06T 7/0012; G06T 17/00; G06T 2207/10024; G06T 2207/10028; G06T 2207/20072; G06T 2207/20081; G06T 2207/20084; G06T 2207/30128;
(Continued)

(56) References Cited

U.S. PATENT DOCUMENTS

2019/0362146 A1* 11/2019 Polzounov ............. G06N 3/045
2020/0126232 A1* 4/2020 Guo ......................... G06N 3/08
(Continued)

FOREIGN PATENT DOCUMENTS

DE         10221124 A1 * 11/2003   ......... G06K 9/00127

*Primary Examiner* — Dung Hong
(74) *Attorney, Agent, or Firm* — LeonardPatel PC; Sheetal S. Patel; Michael A. Leonard, II (57) ABSTRACT

A digital detection method and system for predicting drug resistance of transgenic maize are disclosed. The method includes acquiring an RGB image, three-dimensional point cloud data and chlorophyll relative content of a maize plant after medicament spraying at a current moment; calculating a pixel ratio and morphological feature according to the RGB image and three-dimensional point cloud data; inputting a detection parameter of the maize plant at the current moment into a series model to predict the detection parameter of the maize plant at a next moment to obtain a graph of change in the detection parameter in a next period; estimating a drug resistance characteristic according to the graph of the change in the detection parameter of the maize plant; and inputting the detection parameter of the maize plant at the current moment into a parallel model to predict the variety of the maize plant.

10 Claims, 6 Drawing Sheets

(51) Int. Cl.
  *G06T 7/62* (2017.01)
  *G06T 7/11* (2017.01)
  *G06T 7/90* (2017.01)
  *A01G 22/20* (2018.01)
  *G01S 17/894* (2020.01)
  *G06T 7/00* (2017.01)
  *G06T 17/00* (2006.01)
  *G06N 3/044* (2023.01)
  *G06N 3/045* (2023.01)

(52) U.S. Cl.
  CPC ........... *G06N 3/045* (2023.01); *G06T 7/0012* (2013.01); *G06T 7/11* (2017.01); *G06T 7/136* (2017.01); *G06T 7/62* (2017.01); *G06T 7/90* (2017.01); *G06T 17/00* (2013.01); *G06T 2207/10024* (2013.01); *G06T 2207/10028* (2013.01); *G06T 2207/20072* (2013.01); *G06T 2207/20081* (2013.01); *G06T 2207/20084* (2013.01); *G06T 2207/30128* (2013.01); *G06T 2207/30188* (2013.01)

(58) Field of Classification Search
  CPC .......... G06T 2207/30188; A01G 22/20; G01S 17/894; G06N 3/045; G06N 3/044
  See application file for complete search history.

(56) References Cited

U.S. PATENT DOCUMENTS

2021/0056338 A1* 2/2021 Padwick .................... G06T 7/11
2022/0283074 A1* 9/2022 Willaert .................... G06N 3/08

* cited by examiner

```
┌─────────────────────────────────────────────────────────┐
│  Acquiring detection information of a maize plant after │   101
│      medicament spraying at a current moment            │
└─────────────────────────────────────────────────────────┘
                           │
                           ▼
┌─────────────────────────────────────────────────────────┐
│    Calculating a pixel ratio of the maize plant at the  │   102
│    current moment according to the RGB image at the     │
│                    current moment                       │
└─────────────────────────────────────────────────────────┘
                           │
                           ▼
┌─────────────────────────────────────────────────────────┐
│   Calculating a morphological feature of the maize plant│
│   at the current moment according to the three-         │   103
│   dimensional point cloud data at the current moment    │
└─────────────────────────────────────────────────────────┘
                           │
                           ▼
┌─────────────────────────────────────────────────────────┐
│ Inputting a detection parameter of the maize plant at   │
│ the current moment into a series model to predict the   │
│ detection parameter of the maize plant at a next moment │   104
│ to obtain a graph of change in the detection parameter  │
│           of the maize plant in a next period           │
└─────────────────────────────────────────────────────────┘
                           │
                           ▼
┌─────────────────────────────────────────────────────────┐
│  Estimating a drug resistance characteristic of the     │
│  maize plant according to the graph of the change in    │   105
│  the detection parameter of the maize plant             │
└─────────────────────────────────────────────────────────┘
                           │
                           ▼
┌─────────────────────────────────────────────────────────┐
│ Inputting the detection parameter of the maize plant at │
│ current moment into a parallel model to predict a       │   106
│ variety of the maize plant                              │
└─────────────────────────────────────────────────────────┘
```

DIGITAL DETECTION METHOD AND SYSTEM FOR PREDICTING DRUG RESISTANCE OF TRANSGENIC MAIZE

CROSS REFERENCE TO RELATED APPLICATION

This patent application claims the benefit and priority of Chinese Patent Application No. 202110029557.8 filed on Jan. 11, 2021, the disclosure of which is incorporated herein by reference in its entirety.

TECHNICAL FIELD

The present disclosure relates to the technical field of drug resistance detection of maize varieties, and in particular, to a digital detection method and system for predicting drug resistance of transgenic maize.

BACKGROUND ART

Nowadays, the problem of food security is becoming more and more serious. Maize is one of the important food crops in China. Its yield is critical to social stability, economic prosperity and enhancement of comprehensive national strength. The harvest of maize is not only related to genotype, but also affected by complex environment. In other words, only under the appropriate environmental conditions, the excellent genotypes of maize can be fully expressed. Among them, weeds in maize growing environment have strong vitality and often compete with maize for limited resources such as light, water, nutrients and inorganic salts.

Hereby, the herbicide becomes an essential product in agricultural corp protection. How to completely kill weeds as much as possible without interfering with the maize growth becomes one of important research subjects. Currently, the globally widely used glyphosate isopropylamine is a broad-spectrum systemic conducting and extinguishing stem herbicide, and its mechanism of action may be summarized as follows. The herbicide is absorbed by green parts such as weed leaves to be diffused and propagated to whole weeds. Afterwards, the photosynthesis is hindered, and finally weeds are withered. It offers the advantages of high efficiency, stability, low toxicity and minimal residue. Weeds are difficult to produce resistance through mutation when compared to other herbicides. Therefore, with the continuous maturity of high-throughput gene sequencing technology and the rapid development of genomics, transgenic glyphosate-resistant maize seeds are gaining widespread application in agricultural production.

At present, the drug resistance detection of transgenic maize may be conducted on either maize seed or maize plant. Morphological feature parameters such as plant height, leaf length and leaf width are mainly measured manually, which is time-consuming, has a long detection period and is inefficient. The patent with the publication number of CN106576829A discloses a method for identifying glyphosate resistant maize varieties. This method takes maize seeds as the object, and determines whether the test seeds have glyphosate resistance by testing the changes of physiological and morphological indexes of maize seeds. Although the method is less demanding on the surrounding environment and has a short test period, the final performance of drug resistance of maize is not completely consistent with that of its seeds due to the complex and changeable environmental impact during the growth process of maize.

SUMMARY

An object of the disclosure is to provide a digital detection method and system for predicting resistance of transgenic maize to realize the rapid screening and performance evaluation of the resistant transgenic maize varieties.

In order to achieve the above object, technical solutions of the present disclosure are specifically described as follows.

A digital detection method for predicting drug resistance of transgenic maize, includes:

acquiring detection information of a maize plant after medicament spraying at a current moment; in which the detection information comprises an RGB image, three-dimensional point cloud data and a chlorophyll relative content;

calculating a pixel ratio of the maize plant at the current moment according to the RGB image at the current moment; in which the pixel ratio is a ratio of a pixel point number in a first region of the maize plant to a pixel point number in a second region of the maize plant; the first region of the maize plant is a leaf region of the maize plant that changes after the maize plant is treated by the medicament; and the second region is a region of all the leaves of the maize plant;

calculating a morphological feature of the maize plant at the current moment according to the three-dimensional point cloud data at the current moment; in which the morphological feature comprises a plant height, a crown layer diameter, a stem thickness, a stem height, a first leaf length, a first leaf width, a second leaf length, a second leaf width, a third leaf length, and a third leaf width; the first leaf length, the second leaf length and the third leaf length are defined according to an order in which a root of the maize plant is upward and the branches and leaves are inward; and the first leaf width, the second leaf width and the third leaf width are defined according to an order in which the root of the maize plant is upward and the branches and leaves are inward;

inputting a detection parameter of the maize plant at the current moment into a series model to predict the detection parameter of the maize plant at a next moment to obtain a graph of change in the detection parameter of the maize plant in a next period; in which the series model is constructed based on a convolutional neural network and a long-short term memory network; the detection parameter comprises a chlorophyll relative content, the pixel ratio, the plant height, the crown layer diameter, the stem thickness, the stem height, the first leaf length, the first leaf width, the second leaf length, the second leaf width, the third leaf length and the third leaf width; and the period is composed of a plurality of successive moments;

estimating a drug resistance characteristic of the maize plant according to the graph of the change in the detection parameter of the maize plant; and inputting the detection parameter of the maize plant at the current moment into a parallel model to predict a variety of the maize plant; in which the parallel model is constructed based on a convolutional neural network and a long-short term memory network.

According to an embodiment, the acquiring the detection information of a maize plant after the medicament spraying at a current moment includes:

acquiring the RGB image of the maize plant after the medicament spraying at the current moment as acquired by a photographing apparatus;

acquiring the chlorophyll relative content of the maize plant after the medicament spraying at the current moment as collected by a hand-held chlorophyll assay instrument; and acquiring the three-dimensional point cloud data of the maize plant after the medicament spraying at the current moment as acquired by a hand-held three-dimensional laser scanner.

According to an embodiment, the calculating a pixel ratio of the maize plant at the current moment according to the RGB image at the current moment includes:

performing a binarization, image filtering, noise removing and masking processing on the RGB image at the current moment to extract a color image with only the maize plant at the current moment;

determining the second region at the current moment according to the color image of the maize plant at the current moment;

segmenting the color image of the maize plant at the current moment by an Otsu method to obtain the first region at the current moment; and calculating the pixel ratio of the maize plant at the current moment according to the pixel point number in the first region at the current moment and the pixel point number in the second region at the current moment.

According to an embodiment, the calculating the morphological feature of the maize plant at the current moment according to the three-dimensional point cloud data at the current moment includes:

reconstructing a three-dimensional model of the maize plant according to the three-dimensional point cloud data at the current moment;

pre-processing the three-dimensional model, and storing point cloud data of the pre-processed three-dimensional model according to an octree structure to determine neighborhood information of each point cloud data;

determining an initial morphological feature of the maize plant at the current moment according to the neighborhood information of each point cloud data; and correcting the initial morphological feature to obtain a final morphological feature of the maize plant at the current moment.

According to an embodiment, a construction process of the series model includes:

determining a training sample, in which the training sample is a data set with temporal continuity; the data set includes a number of data subsets with temporal continuity; the data subset includes a chlorophyll relative content, a pixel ratio, a plant height, a crown layer diameter, a stem thickness, a stem height, a first leaf length, a first leaf width, a second leaf length, a second leaf width, a third leaf length and a third leaf width at a certain time;

constructing a series network structure, in which the series network structure is composed of the convolutional neural network and the long-short term memory network connected in series; and successively inputting the data subsets of the training sample into the series network structure to train the series network structure to obtain a trained series network structure; in which the trained series network structure is the series model; and an output of the series model is the detection parameter at a next moment.

According to an embodiment, a construction process of the parallel model includes:

determining a training sample, in which the training sample is a data set with temporal continuity; the data set includes a number of data subsets with temporal continuity; the data subset includes a chlorophyll relative content, a pixel ratio, a plant height, a crown layer diameter, a stem thickness, a stem height, a first leaf length, a first leaf width, a second leaf length, a second leaf width, a third leaf length and a third leaf width at a certain time;

constructing a parallel network structure, in which the parallel network structure is composed of the convolutional neural network and the long-short term memory network connected in parallel; and successively inputting the data subsets of the training sample into the parallel network structure to train the parallel network structure to obtain a trained parallel network structure; in which the trained parallel network structure is the parallel model; an output of the parallel model is the variety of the maize plant; and the variety of the maize plant comprises a transgenic maize variety and a non-transgenic maize variety.

A digital detection system for predicting drug resistance of transgenic maize includes:

a detection information acquisition module, configured to acquire detection information of a maize plant after medicament spraying at a current moment; in which the detection information includes an RGB image, three-dimensional point cloud data and a chlorophyll relative content;

a pixel ratio calculation module, configured to calculate a pixel ratio of the maize plant at the current moment according to the RGB image at the current moment; in which the pixel ratio is a ratio of a pixel point number in a first region of the maize plant to a pixel point number in a second region of the maize plant; the first region of the maize plant is a leaf region of the maize plant that changes after the maize plant is treated by the medicament; and the second region is a region of all the leaves of the maize plant;

a morphological feature calculation module, configured to calculate a morphological feature of the maize plant at the current moment according to the three-dimensional point cloud data at the current moment; in which the morphological feature includes a plant height, a crown layer diameter, a stem thickness, a stem height, a first leaf length, a first leaf width, a second leaf length, a second leaf width, a third leaf length, and a third leaf width; the first leaf length, the second leaf length and the third leaf length are defined according to an order in which the root of the maize plant is upward and the branches and leaves are inward; and the first leaf width, the second leaf width and the third leaf width are defined according to an order in which the root of the maize plant is upward and the branches and leaves are inward;

a detection parameter and detection parameter changing graph prediction module, configured to input a detection parameter of the maize plant at the current moment into a series model to predict the detection parameter of the maize plant at a next moment to obtain a graph of change in the detection parameter of the maize plant in a next period; in which the series model is constructed based on a convolutional neural network and a long-short term memory network; the detection parameter comprises the chlorophyll relative content, the pixel ratio, the plant height, the crown layer diameter, the stem thickness, the stem height, the first leaf length, the first leaf width, the second leaf length, the second leaf width, the third leaf length and the third leaf width; and the period is composed of a plurality of successive moments;

a drug resistance characteristic determination module, configured to estimate a resistance characteristic of the maize plant according to the graph of the change in the detection parameter of the maize plant; and a plant variety prediction module, configured to input the detection parameter of the maize plant at the current moment into a parallel model to predict a variety of the maize plant; in which the parallel model is constructed based on a convolutional neural network and a long-short term memory network.

According to an embodiment, the detection information acquisition module includes:

an RGB image acquisition unit, configured to acquire an RGB image of the maize plant after the medicament spraying at the current moment as captured by a photographing apparatus;

a chlorophyll relative content acquisition unit, configured to acquire the chlorophyll relative content of the maize plant after the medicament spraying at the current moment as collected by a hand-held chlorophyll assay instrument; and a three-dimensional point cloud data acquisition unit, configured to acquire the three-dimensional point cloud data of the maize plant after the medicament spraying at the current moment as collected by a hand-held three-dimensional laser scanner.

According to an embodiment, the pixel ratio calculation module includes:

an image pre-processing unit, configured to perform a binarization, image filtering, noise removing and masking processing on the RGB image at the current moment to extract a color image with only the maize plant at the current moment;

a second region determination unit, configured to determine the second region at the current moment according to the color image of the maize plant at the current moment;

a first region determination unit, configured to segment the color image of the maize plant at the current moment by an Otsu method to obtain the first region at the current moment; and a pixel ratio calculation unit, configured to calculate the pixel ratio of the maize plant at the current moment according to the pixel point number in the first region at the current moment and the pixel point number in the second region at the current moment.

According to an embodiment, the morphological feature calculation module includes:

a three-dimensional model reconstruction unit, configured to reconstruct a three-dimensional model of the maize plant according to the three-dimensional point cloud data at the current moment;

a point cloud data neighborhood information determination unit, configured to pre-process the three-dimensional model, and store point cloud data of the pre-processed three-dimensional model according to an octree structure to determine neighborhood information of each point cloud data;

an initial morphological feature determination unit, configured to determine an initial morphological feature of the maize plant at the current moment according to the neighborhood information of each point cloud data; and a correction unit, configured to correct the initial morphological feature to obtain a final morphological feature of the maize plant at the current moment.

According to the specific embodiments provided by the disclosure, the following technical effects are disclosed.

According to the present disclosure, the difference of drug resistance between transgenic maize varieties and non-transgenic maize varieties after chemical stress can be predicted with 12 maize plant parameters by means of the convolution neural network and the long-short term memory network so as to implement rapid screening and performance evaluation of the drug resistant transgenic maize varieties.

BRIEFT DESCRIPTION OF THE DRAWINGS

In order to explain the embodiments of the present disclosure or the technical solutions in the prior art more clearly, the following drawings that need to be used in the description of the embodiments or the prior art will be briefly introduced. Obviously, the drawings in the following descriptions are only embodiments of the present disclosure. For those of ordinary skill in the art, other drawings can be obtained based on the drawings disclosed without creative efforts.

DETAILED DESCRIPTION OF THE EMBODIMENTS

Technical solutions of the present disclosure will be clearly and completely described below with reference to the embodiments. Obviously, the described embodiments are only part of the embodiments of the present disclosure, not all of them. Other embodiments made by those of ordinary skill in the art without sparing any creative efforts shall fall within the scope of the disclosure.

An object of the disclosure is to provide a digital detection method and system for predicting drug resistance of transgenic maize to realize the rapid screening and performance evaluation of glyphosate resistant transgenic maize varieties.

In order to make the above object, features and advantages of the disclosure more obvious and easier to understand, the disclosure will be further described in detail in combination with the drawings and the specific embodiments.

Embodiment 1

Figure 1:
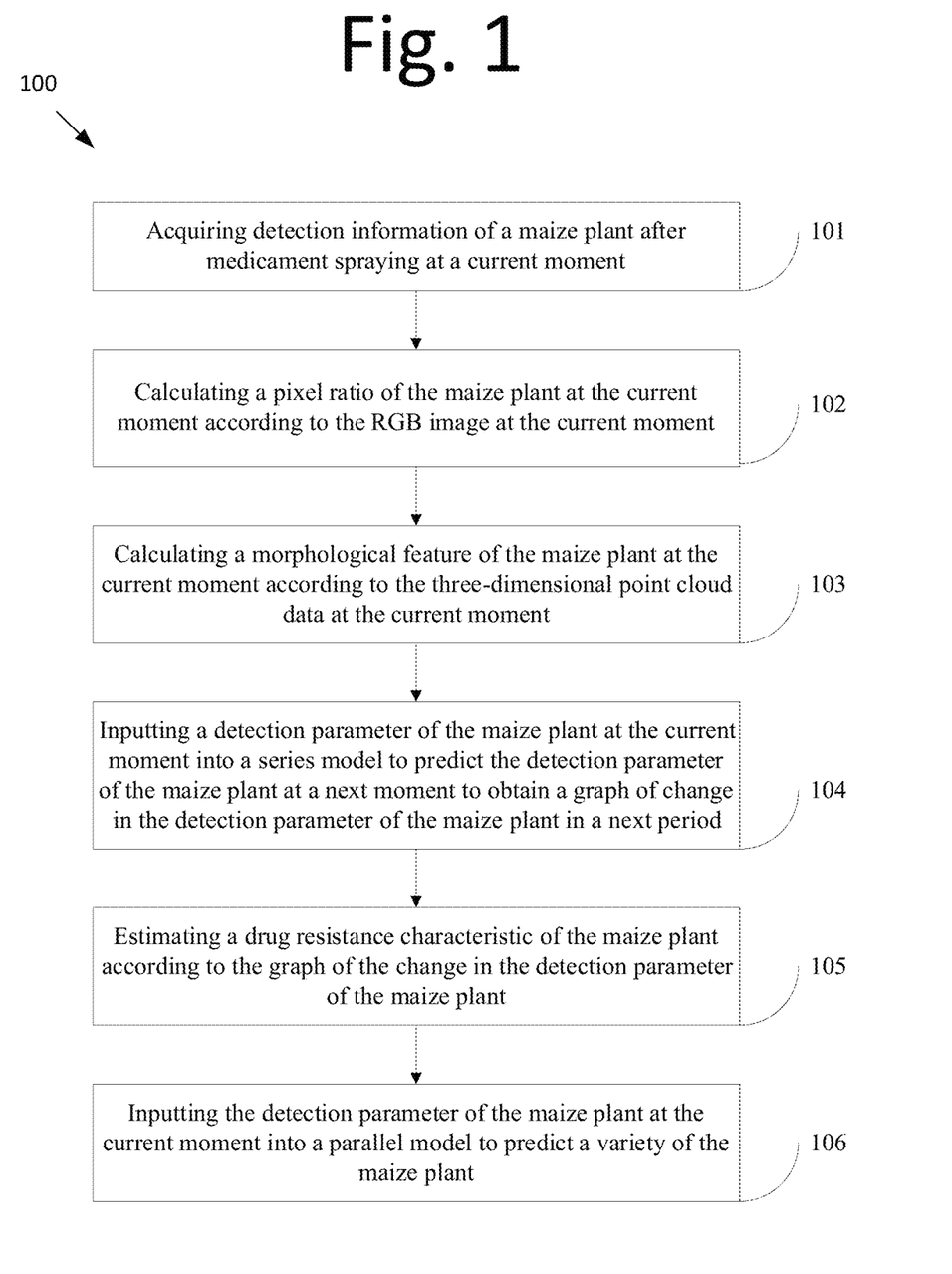
FIG. 1 is a schematic flow chart of a digital detection method for predicting drug resistance of transgenic maize, according to the present disclosure.

As shown in FIG. 1, a digital detection method 100 for predicting drug resistance of transgenic maize provided by the present embodiment includes the following steps.

In step 101, detection information of a maize plant after medicament spraying at a current moment is acquired. The detection information includes an RGB image, three-dimensional point cloud data and a chlorophyll relative content.

In step 102, a pixel ratio of the maize plant at the current moment is calculated according to the RGB image at the current moment. The pixel ratio is a ratio of a pixel point number in a first region of the maize plant to a pixel point number in a second region of the maize plant. The first region of the maize plant is a leaf region of the maize plant that changes after the maize plant is treated by the medicament. The second region is a region of all the leaves of the maize plant.

In step 103, a morphological feature of the maize plant at the current moment is calculated according to the three-dimensional point cloud data at the current moment. The morphological feature includes a plant height, a crown layer diameter, a stem thickness, a stem height, a first leaf length, a first leaf width, a second leaf length, a second leaf width, a third leaf length, and a third leaf width. The first leaf length, the second leaf length and the third leaf length are defined according to an order in which the root of the maize plant is upward and the branches and leaves are inward. The first leaf width, the second leaf width and the third leaf width are defined according to an order in which the root of the maize plant is upward and the branches and leaves are inward.

In step 104, a detection parameter of the maize plant at the current moment is input into a series model to predict the detection parameter of the maize plant at a next moment to obtain a graph of the change in the detection parameter of the maize plant in a next period. The series model is constructed based on a convolutional neural network and a long-short term memory network. The detection parameter includes the chlorophyll relative content, the pixel ratio, the plant height, the crown layer diameter, the stem thickness, the stem height, the first leaf length, the first leaf width, the second leaf length, the second leaf width, the third leaf length and the third leaf width. The period is composed of a number of successive moments.

In step 105, a drug resistance characteristic of the maize plant is estimated according to the graph of the change in the detection parameter of the maize plant.

In step 106, the detection parameter of the maize plant at the current moment is input into a parallel model to predict the variety of the maize plant. The parallel model is constructed based on a convolutional neural network and a long-short term memory network.

According to an implementation, the step 101 provided in this embodiment specifically includes:

acquiring the RGB image of the maize plant after the medicament spraying at the current moment as acquired by a photographing apparatus;

acquiring the chlorophyll relative content of the maize plant after the medicament spraying at the current moment as collected by a hand-held chlorophyll assay instrument; and acquiring the three-dimensional point cloud data of the maize plant after the medicament spraying at the current moment as acquired by a hand-held three-dimensional laser scanner.

According to an implementation, the step 102 provided in this embodiment specifically includes:

performing a binarization, image filtering, noise removing and masking processing on the RGB image at the current moment to extract a color image with only the maize plant at the current moment;

determining the second region at the current moment according to the color image of the maize plant at the current moment;

segmenting the color image of the maize plant at the current moment by Otsu method to obtain the first region at the current moment; and calculating the pixel ratio of the maize plant at the current moment according to the pixel point number in the first region at the current moment and the pixel point number in the second region at the current moment.

According to an implementation, the step 103 provided in this embodiment specifically includes:

reconstructing a three-dimensional model of the maize plant according to the three-dimensional point cloud data at the current moment;

pre-processing the three-dimensional model, and storing point cloud data of the pre-processed three-dimensional model according to an octree structure to determine neighborhood information of each point cloud data;

determining an initial morphological feature of the maize plant at the current moment according to the neighborhood information of each point cloud data; and correcting the initial morphological feature to obtain a final morphological feature of the maize plant at the current moment.

According to an implementation, the construction process of the series model in the embodiment is as follows.

A training sample is determined. The training sample is a data set with temporal continuity. The data set includes a number of data subsets with temporal continuity. The data subset includes a chlorophyll relative content, a pixel ratio, a plant height, a crown layer diameter, a stem thickness, a stem height, a first leaf length, a first leaf width, a second leaf length, a second leaf width, a third leaf length and a third leaf width at a certain time. Before the training sample is determined, the raw data information in a period of time is obtained, and then the training sample is obtained after processing the raw data according to step 102 and step 104. The raw data information includes RGB image, three-dimensional point cloud data and chlorophyll relative content of the transgenic maize varieties, and RGB image, three-dimensional point cloud data and chlorophyll relative content of non-transgenic maize varieties. The transgenic maize varieties and non-transgenic maize varieties described herein are cultivated in the laboratory, and the cultivation process is described in embodiment 3.

A series network structure is constructed. The series network structure is composed of the convolutional neural network and the long-short term memory network connected in series as shown in series network structure 300 of FIG. 3. The size of a single input sample is set to be 5×12. The number of sample time series is 5 and the number of training features is 12. The convolution kernel size of the convolution layer is set to be 1×12. The number of convolution kernels is set to 32. The activation function is Relu function. After convolution layer, the output size is 5×1 matrix that is input into an LSTM layer. The number of neurons in LSTM hidden layer is set to 32. The back propagation process uses Adam optimization algorithm. The learning rate is set to be 0.005. The final output of the LSTM is used as an input of a regression layer to realize the prediction of detection parameters at the next moment.

The data subsets of the training sample are successively inputted into the series network structure to train the series network structure to obtain a trained series network structure. The trained series network structure is the series model. An output of the series model is the detection parameter at a next moment.

According to an implementation, the construction process of the parallel model according to the embodiment is as follows.

A training sample is determined. The training sample is a data set with temporal continuity. The data set includes a number of data subsets with temporal continuity. The data subset includes a chlorophyll relative content, a pixel ratio, a plant height, a crown layer diameter, a stem thickness, a stem height, a first leaf length, a first leaf width, a second leaf length, a second leaf width, a third leaf length and a third leaf width at a certain time. The training samples are the same as those used in the construction process of the series model.

Figure 4:
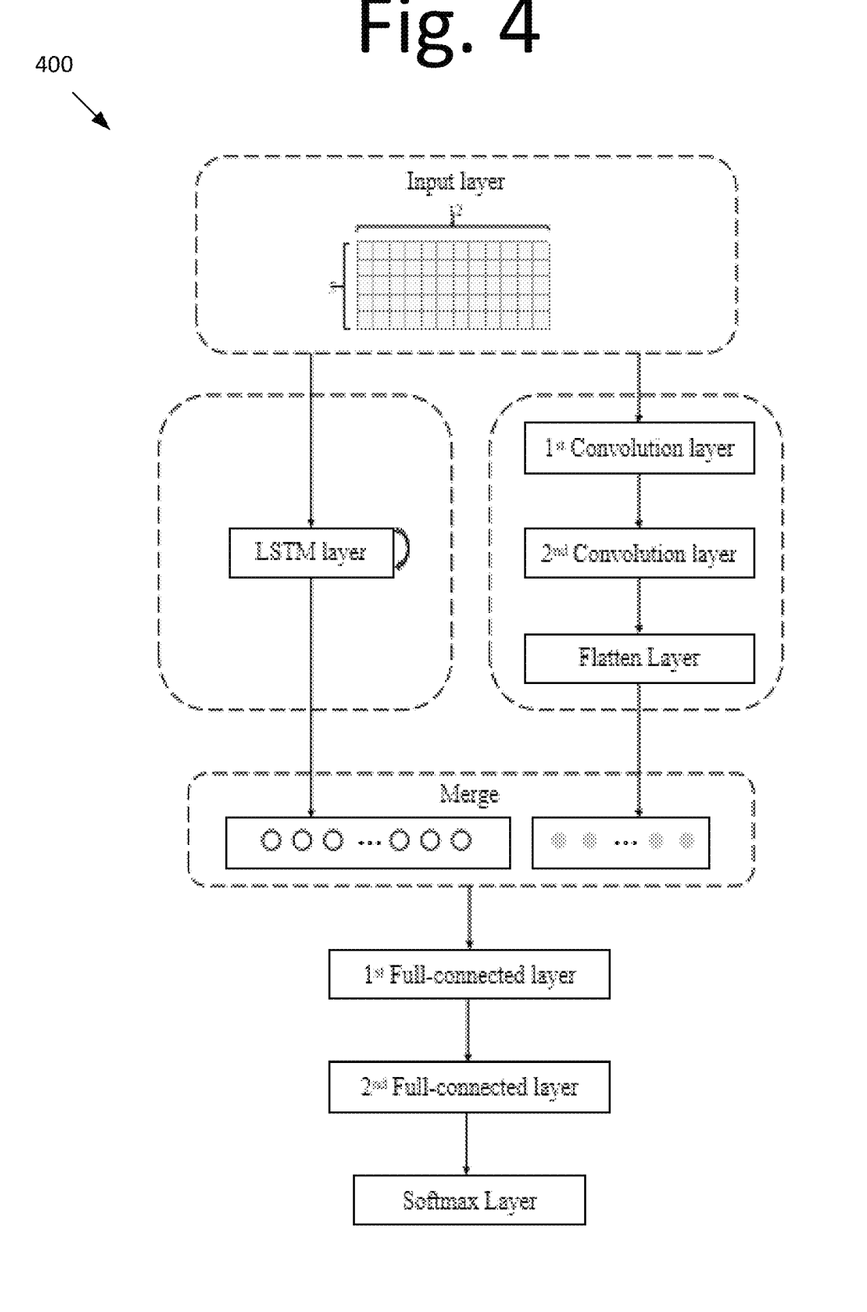
FIG. 4 is a schematic diagram of a parallel network structure, according to the present disclosure.

A parallel network structure is constructed. The parallel network structure is composed of the convolutional neural network and the long-short term memory network connected in parallel as shown in parallel network structure 400 of FIG. 4. The parallel network structure 400 comprises of three parts. The first part includes a layer of LSTMs, and the input matrix is a 5×12 characteristic matrix; the node of each LSTM receives 12 characteristic data at the same moment, with a total of 5 nodes, and the number of neurons is set to 16. The second part includes two convolution layers, the input thereof is the same as the first part, and the convolution kernel size of the two convolution layers is set to 3×3. The number of convolution kernels is set to 32 and 16 respectively, and the activation function is Relu function. The third part includes a fully connected layer and a Softmax layer. Specifically, the feature sequences obtained through splicing of the output of the first and second parts may be learned through the fully connected layer with 16 neurons, and the Softmax layer (with 2 neurons) plays a role of identification of transgenic maize and non-transgenic maize, ending up implementing the rapid screening and performance evaluation of glyphosate resistant maize varieties.

The data subsets of the training sample is successively input into the parallel network structure to train the parallel network structure to obtain a trained parallel network structure. The trained parallel network structure is the parallel model, and an output of the parallel model is the variety of the maize plant. The variety of maize plant includes a transgenic maize variety and a non-transgenic maize variety.

Embodiment 2

Figure 2:
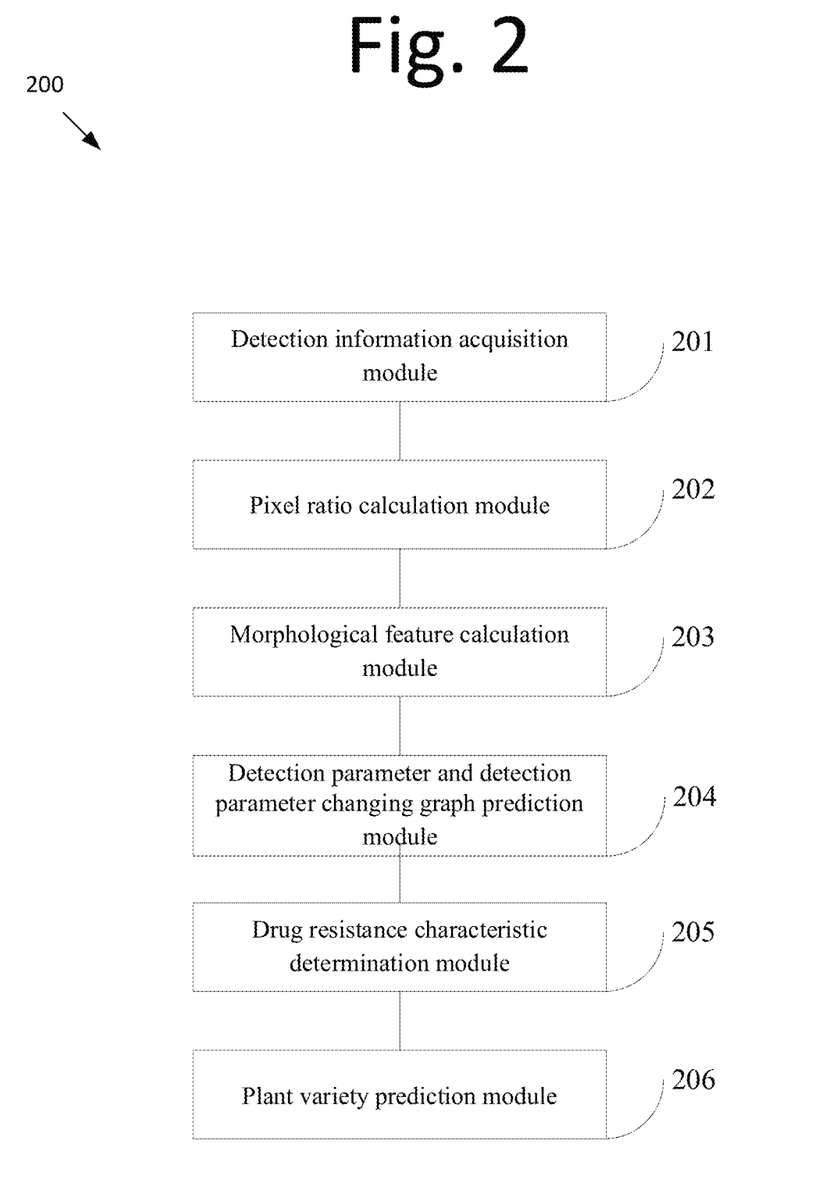
FIG. 2 is a schematic structural diagram of the digital detection system for predicting drug resistance of transgenic maize, according to the present disclosure.

As shown in FIG. 2, the digital detection system 200 for predicting the drug resistance of transgenic maize provided by the embodiment includes the following modules.

A detection information acquisition module 201 is configured to acquire detection information of a maize plant after medicament spraying at a current moment. The detection information includes an RGB image, three-dimensional point cloud data and a chlorophyll relative content.

A pixel ratio calculation module 202 is configured to calculate a pixel ratio of the maize plant at the current moment according to the RGB image at the current moment. The pixel ratio is a ratio of a pixel point number in a first region of the maize plant to a pixel point number in a second region of the maize plant. The first region of the maize plant is a leaf region of the maize plant that changes after the maize plant is treated by the medicament. The second region is a region of all the leaves of the maize plant.

A morphological feature calculation module 203 is configured to calculate a morphological feature of the maize plant at the current moment according to the three-dimensional point cloud data at the current moment. The morphological feature includes a plant height, a crown layer diameter, a stem thickness, a stem height, a first leaf length, a first leaf width, a second leaf length, a second leaf width, a third leaf length, and a third leaf width. The first leaf length, the second leaf length and the third leaf length are defined according to an order in which the root of the maize plant is upward and the branches and leaves are inward. The first leaf width, the second leaf width and the third leaf width are defined according to an order in which the root of the maize plant is upward and the branches and leaves are inward.

A detection parameter and detection parameter change graph prediction module 204 is configured to input a detection parameter of the maize plant at the current moment into a series model to predict the detection parameter of the maize plant at a next moment to obtain a graph of the change in the detection parameter of the maize plant in a next period. The series model is constructed based on the convolutional neural network and the long-short term memory network. The detection parameter includes the chlorophyll relative content, the pixel ratio, the plant height, the crown layer diameter, the stem thickness, the stem height, the first leaf length, the first leaf width, the second leaf length, the second leaf width, the third leaf length and the third leaf width. The period is composed of a number of successive moments.

A drug resistance characteristic determination module 205 is configured to estimate a resistance characteristic of the maize plant according to the graph of the change in the detection parameter of the maize plant.

A plant variety prediction module 206 is configured to input the detection parameter of the maize plant at the current moment into a parallel model to predict the variety of the maize plant. The parallel model may be constructed based on the convolutional neural network and the long-short term memory network.

Among them, the detection information acquisition module 201 specifically includes:

an RGB image acquisition unit, configured to acquire the RGB image of the maize plant after the medicament spraying at the current moment as captured by a photographing apparatus;

a chlorophyll relative content acquisition unit, configured to acquire the chlorophyll relative content of the maize plant after the medicament spraying at the current moment as collected by a hand-held chlorophyll assay instrument; and a three-dimensional point cloud data acquisition unit, configured to acquire the three-dimensional point cloud data of the maize plant after the medicament spraying at the current moment as collected by a hand-held three-dimensional laser scanner.

The pixel ratio calculation module 202 specifically includes:

an image pre-processing unit, configured to perform a binarization, image filtering, noise removing and masking processing on the RGB image at the current moment to extract a color image with only the maize plant at the current moment;

a second region determination unit, configured to determine the second region at the current moment according to the color image of the maize plant at the current moment;

a first region determination unit, configured to segment the color image of the maize plant at the current moment by the Otsu method to obtain the first region at the current moment; and a pixel ratio calculation unit, configured to calculate the pixel ratio of the maize plant at the current moment according to the pixel point number in the first region at the current moment and the pixel point number in the second region at the current moment.

The morphological feature calculation module 203 specifically includes:

a three-dimensional model reconstruction unit, configured to reconstruct a three-dimensional model of the maize plant according to the three-dimensional point cloud data at the current moment;

a point cloud data neighborhood information determination unit, configured to pre-process the three-dimensional model, and store point cloud data of the pre-processed three-dimensional model according to an octree structure to determine neighborhood information of each point cloud data;

an initial morphological feature determination unit, configured to determine an initial morphological feature of the maize plant at the current moment according to the neighborhood information of each point cloud data; and a correction unit, configured to correct the initial morphological feature to obtain a final morphological feature of the maize plant at the current moment.

Embodiment 3

The digital detection method for predicting the drug resistance of transgenic maize provided by the embodiment includes the following steps.

Step S1: Preparation of Experimental Materials.

Several transgenic maize seeds (glyphosate-insensitive 5-enolpyruvylshikimate-3-phosphate synthase, EPSPS) and non-transgenic maize seeds used in this embodiment were provided by Zhejiang Academy of Agricultural Sciences. Glyphosate isopropylamine salt aqueous solution (400 ml) was provided by Hangzhou plant protection station, Zhejiang Province. Before sowing, the seeds needed to be soaked in water for 12 hours to fully absorb water and facilitate germination.

Step S2: Preparation of Maize Sample.

Figure 3:
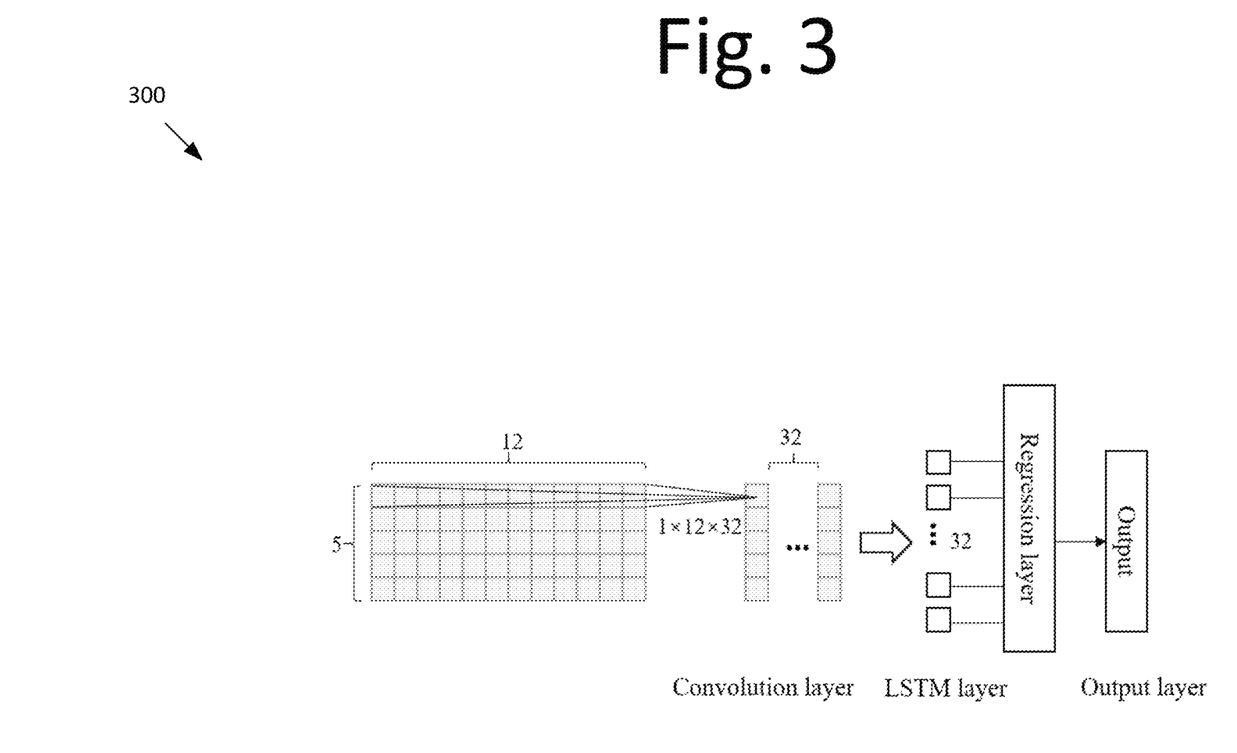
FIG. 3 is a schematic diagram of a series network structure, according to the present disclosure.

The soaked seeds were sown in pots (upper diameter of 11.5 cm, height of 11 cm, bottom diameter of 8 cm). In order to ensure that each pot has a corn plant, it is required that two corn seeds are sown in each pot. After labeling, all pots were cultured in the incubator with two periods. The first period was 12 hours, the temperature was 25° C., and the illuminance was 80%. The second period was 12 hours, the temperature was 21° C., and the illuminance was 0. After the seeds germinated, according to the actual situation of each pot of maize seedlings, only one corn seedling was left in each pot, as shown in FIG. 3. At this time, there were 20 transgenic maize plants and 20 non-transgenic maize plants. Among them, 15 experimental groups and 5 control groups are set for each variety.

After 18 days, when the maize plants basically grew to the three leaf stage, the experiment group of transgenic maize and non-transgenic maize plants were sprayed with Glyphosate isopropylamine salt aqueous solution with a concentration of 1080 a.e.ha$^{-1}$ and a spray dose of 120 L·ha$^{-1}$. At the same time, all maize plants in the control group were sprayed with the same dose of water. The following data were collected on the 1st, 2nd, 3rd, 4th, 5th and 6th day after spraying. The function of setting the control group in this embodiment was to measure the difference in the performance of the same variety at the same moment after being treated with water and glyphosate isopropylamine salt aqueous solution respectively, so as to eliminate the influence of other variables on the results.

Step S3: data acquisition and pre-processing.

In order to minimize the impact of external environment and other factors, all data collection work should be completed at the same period of time every day.

Figure 5:
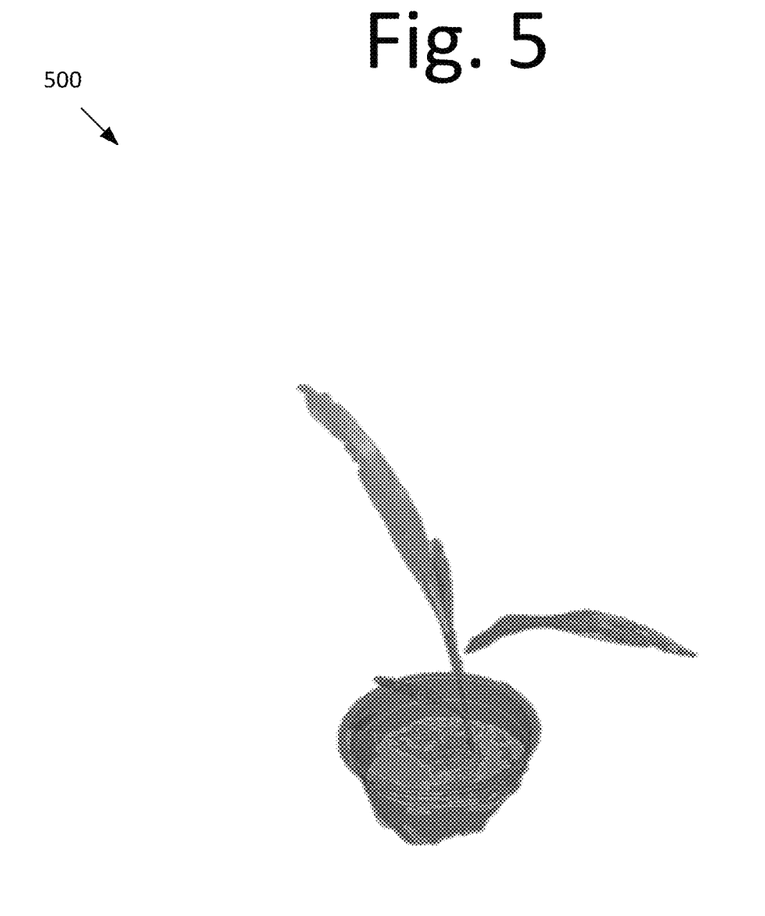
FIG. 5 is a schematic three-dimensional model of a potted maize plant in three leaf stage reconstructed, according to the present disclosure.
Figure 6:
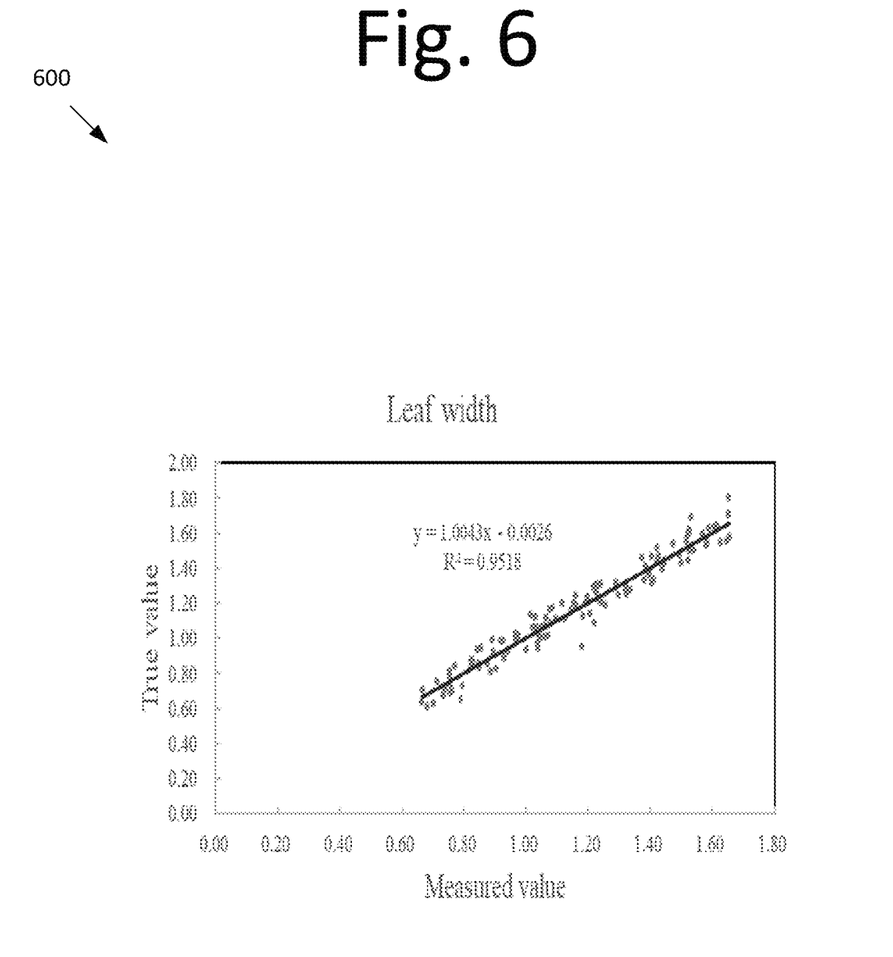
FIG. 6 shows a linear relationship between the corrected parameter value and the manually measured value (regarded as the true value) by taking leaf width as an example, according to the present disclosure.

The specific implementation steps are as follows: 1) the chlorophyll relative content $X_{1i}$ (i=1, 2, 3, ..., $X_{1i}$ represents the data collected at the i-th moment, the same below) was measured by using a hand-held chlorophyll assay instrument. 2) The black flannel was taken as the background, the RGB images of all maize plants were captured by mobile phone from the perspective of fully extending maize plants as far as possible. Then, based on MATLAB 2015b software, the color images with only maize plants were extracted through binarization, image filtering, noise removing, masking processing and other processing. Then, based on the RGB space, the region changed by glyphosate isopropylamine salt was segmented by the Otsu method, and the ratio X2i of the pixel point number of the region to the total pixel point number of all leaves of the maize plant was calculated. 3) By comparing various three-dimensional point cloud data acquisition methods, and by taking the convenience of operation, the quality of point cloud data and the difficulty of post-processing the data into consideration, this embodiment used a hand-held three-dimensional laser scanner to acquire the three-dimensional point cloud data of maize plants, and then the three-dimensional model of maize plants was reconstructed, as shown in potted maize plant 500 of FIG. 5. Next, through point cloud data sampling, point cloud data de-noising, filtering and other pre-processing, the number of point cloud data was reduced as much as possible while ensuring the point cloud characteristics of maize plant so as to simplify the follow-up calculation and improve the efficiency. The pre-processed point cloud data was stored in the octree structure to give the neighborhood information of each point cloud data. Then, the stems and leaves were extracted and separated based on skeleton, 10 morphological parameters of maize plants were obtained: plant height $X_{3i}$, crown layer diameter $X_{4i}$, stem thickness $X_{5i}$, stem height $X_{6i}$, first leaf length $X_{7i1}$, first leaf width $X_{8i1}$, second leaf length $X_{7i2}$, second leaf width $X_{8i2}$, third leaf length $X_{7i3}$ and third leaf width $X_{8i3}$. The first leaf length $X_{7i1}$, the second leaf length $X_{7i2}$ and the third leaf length $X_{7i3}$ were defined in the order of root upward and branches and leaves inward. The first leaf width $X_{8i1}$, the second leaf width $X_{8i2}$ and the third leaf width $X_{8i3}$ were defined in the order of root upward and branches and leaves inward. Finally, the above 10 morphological feature parameters were corrected according to the point cloud measurement values of standard parts with known scale parameters (Specifically, the three-dimensional laser scanner were used to scan the standard parts with known scale parameters in advance. According to the relationship between the parameters extracted based on the three-dimensional model and the standard scale parameters, the morphological feature parameters of maize plants were corrected). The function of three-dimensional point cloud data is to obtain the above 10 morphological parameters in a nondestructive way. FIG. 6 shows the linear relationship 600 between the corrected parameter values and the manually measured values (regarded as the true value) by taking leaf width as an example, where y is the true value of the leaf width (obtained by manual measurement), x is the measured value of the leaf width (extracted based on the three-dimensional point cloud model), and $R^2$ is the correlation coefficient.

Step S4: based on K-means clustering algorithm, the data obtained in step S3 were divided into training set, verification set and prediction set according to the proportion of 75%:15%:10%. Considering the difference of different value range, before the above data was input into LSTM network model and CNN model, it was necessary to normalize the data and adjust the value between [0,1]. The calculation formula is:

$$X' = \frac{X - \text{Min}}{\text{Max} - \text{Min}};$$

where X was the raw data, X' was the normalized data, and Max and min were the maximum and minimum values of the raw data respectively.

Step S5: prediction of the value of each parameter at the next moment.

A series model of convolutional neural networks (CNN) and long-short term memory (LSTM) networks was established by combining the advantages of convolutional neural networks in feature extraction and long-short term memory networks in learning the contextual dependence of sequence data. The size of the single input sample of the series model was 5×12, the number of points of sample time series was 5 and the number of training features was 12. The convolution kernel size of the convolution layer was set to be 1×12. The number of convolution kernels is set to 32, and the activation function is the Relu function. After convolution layer, matrix with size of 5×1, as an output, is input to the LSTM layer. The number of neurons in the LSTM hidden layer was set to 32. Adam optimization algorithm is used in the back propagation process. The learning rate was set to 0.005, and the final output of LSTM is used as an input of the regression layer to realize the prediction of detection parameters at the next moment. That is to say, according to the output of the series model in this step, each parameter value in a period of time in the future is determined, and then the graph of change in each parameter is obtained. Based on this graph, the drug resistances of transgenic maize varieties and non-transgenic maize varieties after glyphosate stress and the difference in drug resistances between them are evaluated.

Step S6: detection of drug resistant transgenic maize.

A parallel model including convolutional neural networks (CNN) and long-short term memory (LSTM) networks is established. Firstly, the temporal sequence features and data local features of each parameter are extracted from LSTM and CNN network structure respectively, and are then fused. The classification results of transgenic maize and non-transgenic maize are output after processing through the fully connected layer and the Softmax layer sequentially, so as to realize the rapid screening and performance evaluation of glyphosate resistant maize varieties.

The three-dimensional model is obtained based on the RGB image and three-dimensional laser scanning technology, and the CNN-LSTM model is applied to predict the drug resistance of transgenic maize varieties and non-transgenic maize varieties after glyphosate stress and difference in drug resistance, so as to realize rapid screening and performance evaluation of glyphosate resistant transgenic maize varieties.

Various embodiments in the present description are described in a progressive manner, and the emphasizing description of each embodiment is different from the other embodiments, and the same similar parts between various embodiments can be referred to for each other. For the system disclosed in the embodiments, since the system corresponds to the method disclosed in the embodiments, the description is simplified, and reference may be made to the method part for description.

The principles and implementations of the present disclosure are set forth herein by applying specific examples, and the description of the above embodiments is merely used to help understanding the method and core idea of the present disclosure. Meanwhile, for a person of ordinary skill in the art, according to the idea of the present disclosure, there will be a change in the specific implementation and application range. In summary, the contents of the present description should not be construed as limiting the present disclosure.

The invention claimed is:

1. A digital detection method for predicting drug resistance of transgenic maize, comprising:
   acquiring detection information of a maize plant after medicament spraying at a current moment; wherein the detection information comprises an RGB image, three-dimensional point cloud data and a chlorophyll relative content;
   calculating a pixel ratio of the maize plant at the current moment according to the RGB image at the current moment; wherein the pixel ratio is a ratio of a pixel point number in a first region of the maize plant to a pixel point number in a second region of the maize plant; the first region of the maize plant is a leaf region of the maize plant that changes after the maize plant is treated by the medicament; and the second region is a region of all the leaves of the maize plant;
   calculating a morphological feature of the maize plant at the current moment according to the three-dimensional point cloud data at the current moment; wherein the morphological feature comprises a plant height, a crown layer diameter, a stem thickness, a stem height, a first leaf length, a first leaf width, a second leaf length, a second leaf width, a third leaf length, and a third leaf width; the first leaf length, the second leaf length and the third leaf length are defined according to an order in which a root of the maize plant is upward and the branches and leaves are inward; and the first leaf width, the second leaf width and the third leaf width are defined according to an order in which the root of the maize plant is upward and the branches and leaves are inward;
   inputting a detection parameter of the maize plant at the current moment into a series model to predict the detection parameter of the maize plant at a next moment to obtain a graph of change in the detection parameter of the maize plant in a next period; wherein the series model is constructed based on a convolutional neural network and a long-short term memory network; the detection parameter comprises a chlorophyll relative content, the pixel ratio, the plant height, the crown layer diameter, the stem thickness, the stem height, the first leaf length, the first leaf width, the second leaf length, the second leaf width, the third leaf length and the third leaf width; and the period is composed of a plurality of successive moments;
   estimating a drug resistance characteristic of the maize plant according to the graph of the change in the detection parameter of the maize plant; and
   inputting the detection parameter of the maize plant at the current moment into a parallel model to predict a variety of the maize plant; wherein the parallel model is constructed based on a convolutional neural network and a long-short term memory network.

2. The digital detection method for predicting drug resistance of transgenic maize of claim 1, wherein the step of acquiring the detection information of a maize plant after the medicament spraying at a current moment comprises:
  acquiring the RGB image of the maize plant after the medicament spraying at the current moment as acquired by a photographing apparatus;
  acquiring the chlorophyll relative content of the maize plant after the medicament spraying at the current moment as collected by a hand-held chlorophyll assay instrument; and
  acquiring the three-dimensional point cloud data of the maize plant after the medicament spraying at the current moment as acquired by a hand-held three-dimensional laser scanner.

3. The digital detection method for predicting drug resistance of transgenic maize of claim 1, wherein the step of calculating a pixel ratio of the maize plant at the current moment according to the RGB image at the current moment comprises:
  performing a binarization, image filtering, noise removing and masking processing on the RGB image at the current moment to extract a color image with only the maize plant at the current moment;
  determining the second region at the current moment according to the color image of the maize plant at the current moment;
  segmenting the color image of the maize plant at the current moment by an Otsu method to obtain the first region at the current moment; and
  calculating the pixel ratio of the maize plant at the current moment according to the pixel point number in the first region at the current moment and the pixel point number in the second region at the current moment.

4. The digital detection method for predicting drug resistance of transgenic maize of claim 1, wherein the step of calculating the morphological feature of the maize plant at the current moment according to the three-dimensional point cloud data at the current moment comprises:
  reconstructing a three-dimensional model of the maize plant according to the three-dimensional point cloud data at the current moment;
  pre-processing the three-dimensional model, and storing point cloud data of the pre-processed three-dimensional model according to an octree structure to determine neighborhood information of each point cloud data;
  determining an initial morphological feature of the maize plant at the current moment according to the neighborhood information of each point cloud data; and
  correcting the initial morphological feature to obtain a final morphological feature of the maize plant at the current moment.

5. The digital detection method for predicting drug resistance of transgenic maize of claim 1, wherein a construction process of the series model comprises:
  determining a training sample; wherein the training sample is a data set with temporal continuity; the data set comprises a plurality of data subsets with temporal continuity; the data subset comprises a chlorophyll relative content, a pixel ratio, a plant height, a crown layer diameter, a stem thickness, a stem height, a first leaf length, a first leaf width, a second leaf length, a second leaf width, a third leaf length and a third leaf width at a certain time;
  constructing a series network structure, wherein the series network structure is composed of the convolutional neural network and the long-short term memory network connected in series; and
  successively inputting the data subsets of the training sample into the series network structure to train the series network structure to obtain a trained series network structure; wherein the trained series network structure is the series model; and an output of the series model is the detection parameter at a next moment.

6. The digital detection method for predicting drug resistance of transgenic maize of claim 1, wherein a construction process of the parallel model comprises:
  determining a training sample, wherein the training sample is a data set with temporal continuity; the data set comprises a plurality of data subsets with temporal continuity; the data subset comprises a chlorophyll relative content, a pixel ratio, a plant height, a crown layer diameter, a stem thickness, a stem height, a first leaf length, a first leaf width, a second leaf length, a second leaf width, a third leaf length and a third leaf width at a certain time;
  constructing a parallel network structure, wherein the parallel network structure is composed of the convolutional neural network and the long-short term memory network connected in parallel; and
  successively inputting the data subsets of the training sample into the parallel network structure to train the parallel network structure to obtain a trained parallel network structure; wherein the trained parallel network structure is the parallel model; an output of the parallel model is the variety of the maize plant; and the variety of the maize plant comprises a transgenic maize variety and a non-transgenic maize variety.

7. A digital detection system for predicting drug resistance of transgenic maize, comprising:
  a detection information acquisition module, configured to acquire detection information of a maize plant after medicament spraying at a current moment; wherein the detection information comprises an RGB image, three-dimensional point cloud data and a chlorophyll relative content;
  a pixel ratio calculation module, configured to calculate a pixel ratio of the maize plant at the current moment according to the RGB image at the current moment; wherein the pixel ratio is a ratio of a pixel point number in a first region of the maize plant to a pixel point number in a second region of the maize plant; the first region of the maize plant is a leaf region of the maize plant that changes after the maize plant is treated by the medicament; and the second region is a region of all the leaves of the maize plant;
  a morphological feature calculation module, configured to calculate a morphological feature of the maize plant at the current moment according to the three-dimensional point cloud data at the current moment; wherein the morphological feature comprises a plant height, a crown layer diameter, a stem thickness, a stem height, a first leaf length, a first leaf width, a second leaf length, a second leaf width, a third leaf length, and a third leaf width; the first leaf length, the second leaf length and the third leaf length are defined according to an order in which the root of the maize plant is upward and the branches and leaves are inward; and the first leaf width, the second leaf width and the third leaf width are defined according to an order in which the root of the maize plant is upward and the branches and leaves are inward;
  a detection parameter and detection parameter changing graph prediction module, configured to input a detection parameter of the maize plant at the current moment into a series model to predict the detection parameter of the maize plant at a next moment to obtain a graph of change in the detection parameter of the maize plant in a next period; wherein the series model is constructed based on a convolutional neural network and a long-short term memory network; the detection parameter comprises the chlorophyll relative content, the pixel ratio, the plant height, the crown layer diameter, the stem thickness, the stem height, the first leaf length, the first leaf width, the second leaf length, the second leaf width, the third leaf length and the third leaf width; and the period is composed of a plurality of successive moments;

a drug resistance characteristic determination module, configured to estimate a resistance characteristic of the maize plant according to the graph of the change in the detection parameter of the maize plant; and a plant variety prediction module, configured to input the detection parameter of the maize plant at the current moment into a parallel model to predict a variety of the maize plant; wherein the parallel model is constructed based on a convolutional neural network and a long-short term memory network.

8. The digital detection system for predicting drug resistance of transgenic maize of claim 7, wherein the detection information acquisition module comprises:

an RGB image acquisition unit, configured to acquire an RGB image of the maize plant after the medicament spraying at the current moment as captured by a photographing apparatus;

a chlorophyll relative content acquisition unit, configured to acquire the chlorophyll relative content of the maize plant after the medicament spraying at the current moment as collected by a hand-held chlorophyll assay instrument; and a three-dimensional point cloud data acquisition unit, configured to acquire the three-dimensional point cloud data of the maize plant after the medicament spraying at the current moment as collected by a hand-held three-dimensional laser scanner.

9. The digital detection system for predicting drug resistance of transgenic maize of claim 7, wherein the pixel ratio calculation module comprises:

an image pre-processing unit, configured to perform a binarization, image filtering, noise removing and masking processing on the RGB image at the current moment to extract a color image with only the maize plant at the current moment;

a second region determination unit, configured to determine the second region at the current moment according to the color image of the maize plant at the current moment;

a first region determination unit, configured to segment the color image of the maize plant at the current moment by an Otsu method to obtain the first region at the current moment; and a pixel ratio calculation unit, configured to calculate the pixel ratio of the maize plant at the current moment according to the pixel point number in the first region at the current moment and the pixel point number in the second region at the current moment.

10. The digital detection system for predicting drug resistance of transgenic maize of claim 7, wherein the morphological feature calculation module comprises:

a three-dimensional model reconstruction unit, configured to reconstruct a three-dimensional model of the maize plant according to the three-dimensional point cloud data at the current moment;

a point cloud data neighborhood information determination unit, configured to pre-process the three-dimensional model, and store point cloud data of the pre-processed three-dimensional model according to an octree structure to determine neighborhood information of each point cloud data;

an initial morphological feature determination unit, configured to determine an initial morphological feature of the maize plant at the current moment according to the neighborhood information of each point cloud data; and a correction unit, configured to correct the initial morphological feature to obtain a final morphological feature of the maize plant at the current moment.

* * * * *